(12) United States Patent
Horng et al.

(10) Patent No.: US 6,700,275 B2
(45) Date of Patent: Mar. 2, 2004

(54) DC MOTOR AND WINDING METHOD FOR COILS THEREOF

(75) Inventors: Alex Horng, Kaohsiung (TW); Ching-Shen Hong, Kaohsiung (TW); Tso-Kuo Yin, Kaohsiung Hsien (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 2 days.

(21) Appl. No.: 09/964,388

(22) Filed: Sep. 28, 2001

(65) Prior Publication Data

US 2003/0062797 A1 Apr. 3, 2003

(51) Int. Cl.⁷ .................................................. H02K 3/00
(52) U.S. Cl. ......................................... 310/179; 29/596
(58) Field of Search ................................. 310/179, 184; 29/596

(56) References Cited

U.S. PATENT DOCUMENTS

| | | | | |
|---|---|---|---|---|
| 1,406,092 A | * | 2/1922 | Schulz et al. ............... 140/92.2 |
| 1,451,374 A | * | 4/1923 | Rogers ....................... 140/92.2 |
| 4,125,792 A | * | 11/1978 | Schmider .................... 310/268 |
| 4,380,833 A | * | 4/1983 | Peters .......................... 2/105 |
| 4,446,393 A | * | 5/1984 | Finegold .................... 310/184 |
| 4,803,389 A | * | 2/1989 | Ogawa et al. ............. 310/49 R |
| 4,883,981 A | * | 11/1989 | Gerfast ..................... 310/40 R |
| 4,922,162 A | * | 5/1990 | Shiraki et al. .............. 310/268 |

\* cited by examiner

*Primary Examiner*—Joseph Waks
(74) *Attorney, Agent, or Firm*—Bacon & Thomas, PLLC

(57) ABSTRACT

A winding method comprises winding a single conducting wire around a predetermined number of pegs in sequence to thereby form a stator coil assembly having even coils and two ends. The winding direction of each coil is opposite to a coil adjacent thereto. The stator coil assembly having even coils is mounted to a casing of a D.C. motor with the coils located corresponding to a permanent magnet of a rotor. The rotor having the permanent magnet is driven to turn by magnetic forces created as a result of energizing the coils.

2 Claims, 7 Drawing Sheets

DC MOTOR AND WINDING METHOD FOR COILS THEREOF

BACKGROUND OF THE INVENTION

1. Field of the Invention

The present invention relates to a D.C. motor and a winding method for coils of the D.C. motor, wherein the stator coils of the motor can be conveniently wound to thereby construct a stator of a D.C. motor.

2. Description of the Related Art

FIG. 7 of the drawings illustrates a conventional D.C. motor stator 90 formed by a radial winding method. In the winding method for the stator 90, an end of a conducting wire 901 forms a first connection $V_1$ before the winding procedure. When the conducting wire 901 has been wound around a half number of the pole arms, i.e., pole arms 90a and 90b of the stator 90, the winding procedure is halted for pulling out the conducting wire 901 to form a second connection $V_0$ (the common connection). Then, the winding procedure continues for the remaining of the pole arms (i.e., pole arms 90c and 90d). After the winding procedure is finished, the other end of the conducting wire 901 forms a third connection $V_2$. The stator 90 may use a dual-coil motor driver to generate alternating rotational magnetic fields to thereby drive the rotor having magnetic poles N and S. Nevertheless, the winding procedure must be interrupted for formation of the second connection $V_0$.

FIG. 8 illustrates a stator 91 using another conventional radial winding method. An end of a conducting wire 911 forms a first connection $V_1$ before winding around the stator 91. After the winding procedure is finished, the other end of the conducting wire 911 forms a second connection $V_2$. The stator 91 may use a single-coil motor driver and supplies the single coil with alternating electric current to generate alternating rotational magnetic fields to thereby drive the rotor having magnetic poles N and S. Nevertheless, in this method using a single conducting wire 911 for carrying out winding, the conducting wire 911 must be wound around each pole arm 91a, 91b, 91c, 91d for as many turns as the required turns of the coil. The winding time for the stator 91 cannot be reduced, as the winding speed is limited.

Another previously proposed D.C. motor, as illustrated in FIG. 9 of the drawings of the present application, comprises a stator 92 having a number of pole arms 92a, 92b, 92c, and 92d around which two conductive wires are wound. Each conducting wire 921, 922 needs to be wound for just a half of turns to finish winding of the stator 92 with required turns. After formation of the winding on the stator 92, it can then be decided the number (two or three) of the connections to be connected with the drive circuit.

Each conducting wire of each of these brushless motors having a radial winding and a radial air gap is wound around each pole arm of the stator. The winding procedure is difficult and the winding speed is largely limited, as the gap between the pole arms is small. In addition, an insulating layer deposited on an outer periphery of the conducting wire tends to be damaged by the pole arms during the winding procedure, which results in a short circuit of the coils.

FIG. 10 of the drawings, which corresponds to FIG. 4 of U.S. Pat. No. 4,922,162 to Shiraki et al. issued on May 1, 1990 and entitled ISK-TYPE SINGLE-PHASE BRSHELESS MOTOR, discloses a stator for a brushless motor having an axial gap. The coils 931 and 932 are firstly wound for the required turns and then bonded by tapes or bonding agents to the stator yokes 93a and 93b on a circuit board 93. Each coil 931, 932 has terminals 931a and 931b, 932a and 932b passing through V-shaped notches in the circuit board 93. The terminal 931a, 931b, 932a, 932b are soldered to a printed conductor pattern formed on a lower face of the printed circuit board 20 so as to establish electric connection therebetween. The coils of such a conventional brushless motor having an axial air gap require careful soldering so as to avoid wrong connection although they can be wound easily.

SUMMARY OF THE INVENTION

It is an object of the present invention to provide a method for carrying out winding of a D.C. motor in which winding of the stator coils can be easily achieved and damage to the coils by the pole plates of the stator during the winding procedure can be avoided.

It is another object of the present invention to provide a D.C brushless motor having stator coils that can be easily fixed for easy processing and assembly.

A winding method in accordance with the present invention comprises winding a single conducting wire around a predetermined number of pegs in sequence to thereby form a stator coil assembly having even coils and two ends. The winding direction of each coil is opposite to a coil adjacent thereto. The stator coil assembly having even coils is mounted to a casing of a D.C. motor with the coils located corresponding to a permanent magnet of a rotor. The rotor having the permanent magnet is driven to turn by magnetic forces created as a result of energizing the coils.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Preferred embodiments in accordance with the present invention will now be described with reference to the accompanying drawings.

Figure 1:
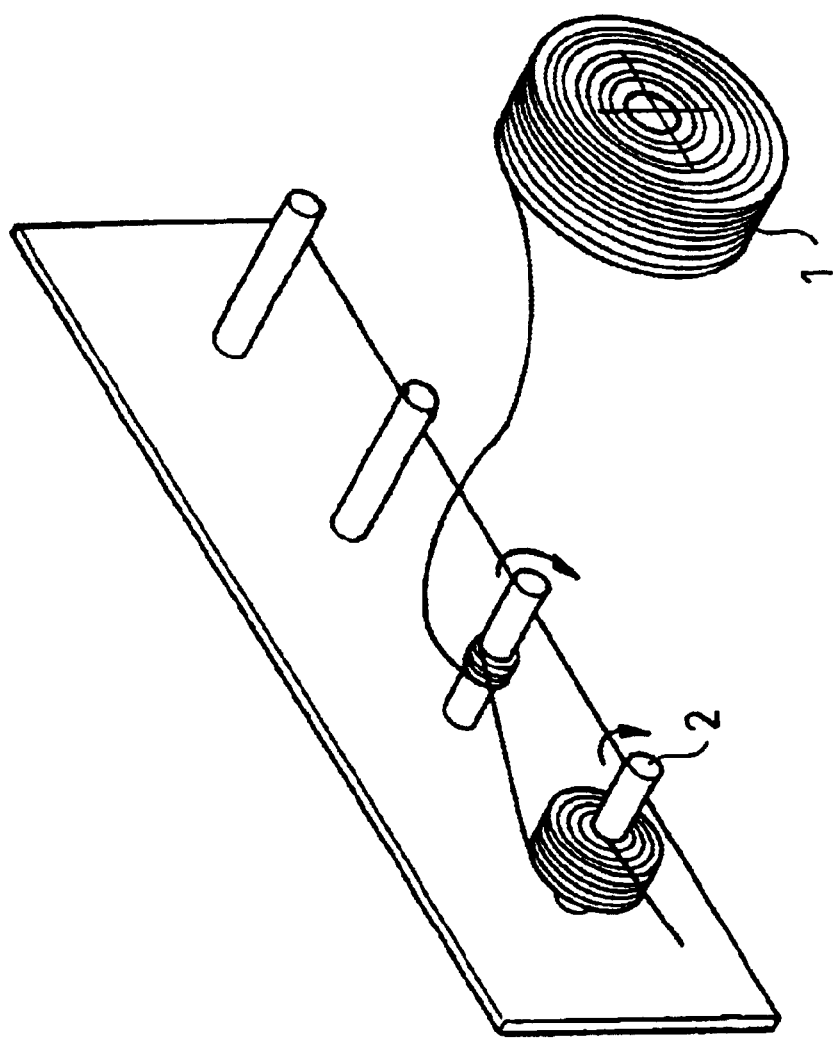
FIG. 1 is a perspective view illustrating a first step of a winding method in accordance with the present invention.
Figure 2:
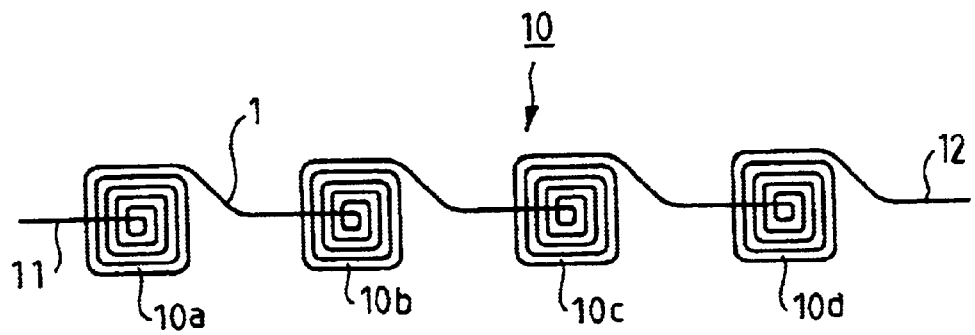
FIG. 2 is a side view illustrating a second step of the winding method in accordance with the present invention.

FIGS. 1 and 2 illustrate a winding method for a stator coil assembly 10 in accordance with the present invention.

The stator coil assembly 10 in accordance with the present invention is formed by means of winding a single conducting wire 1 around a number of pegs 2 having predetermined shapes in sequence and in the same direction (clockwise in FIGS. 1 and 2). The total number of the coils of the stator coil assembly 10 is selected according to the number of poles of the motor to be formed. The turns of each of the even coils 10a, 10b, 10c, and 10d are identical to each other and selected according to need. Thus, the even coils 10a, 10b, 10c, and 10d of the stator coil assembly 10 are formed by means of continuously winding a conducting wire 1 having a first end 11 and a second end 12.

Figure 3:
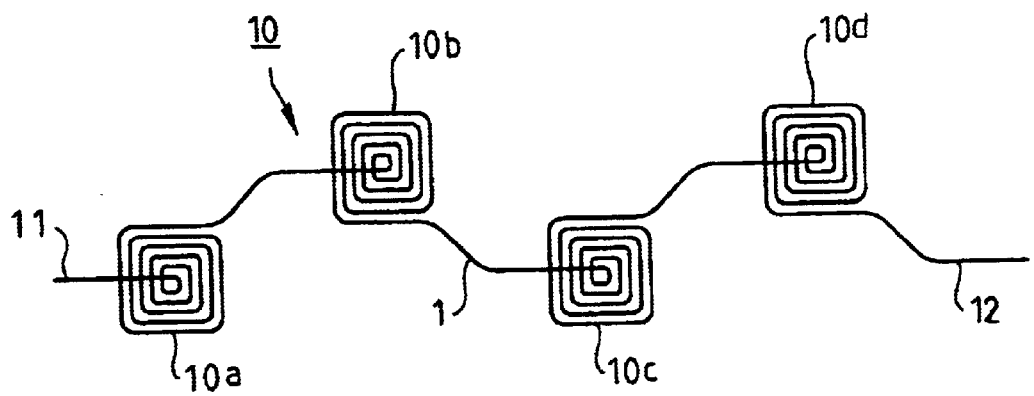
FIG. 3 is a side view illustrating a third step of the winding method in accordance with the present invention.

Referring to FIG. 3, after formation of the stator coil assembly 10 with even coils 10a, 10b, 10c, and 10d by a single, continuous winding procedure, each of the odd-numbered coils (i.e., coil 10a, 10c) or each of the even-numbered coils (i.e., coil 10b, 10d) is turned through 180 In this preferred embodiment, the even-numbered coils 10b and 10d (counting from the left side of the drawings) are turned through 180 Thus, the winding direction of the even-numbered coils 10b and 10d becomes opposite to that of the odd-numbered coils 10a and 10c. In this preferred embodiment, the winding direction of the even-numbered coils 10b and 10d is counterclockwise while the winding direction of the odd-numbered coils 10a and 10c is clockwise. Thus, changing in the direction of the electric current of the coils 10b and 10d and in the direction the resultant magnetic field is allowed by means of changing the winding direction of the coils 10b and 10d.

Figure 4:
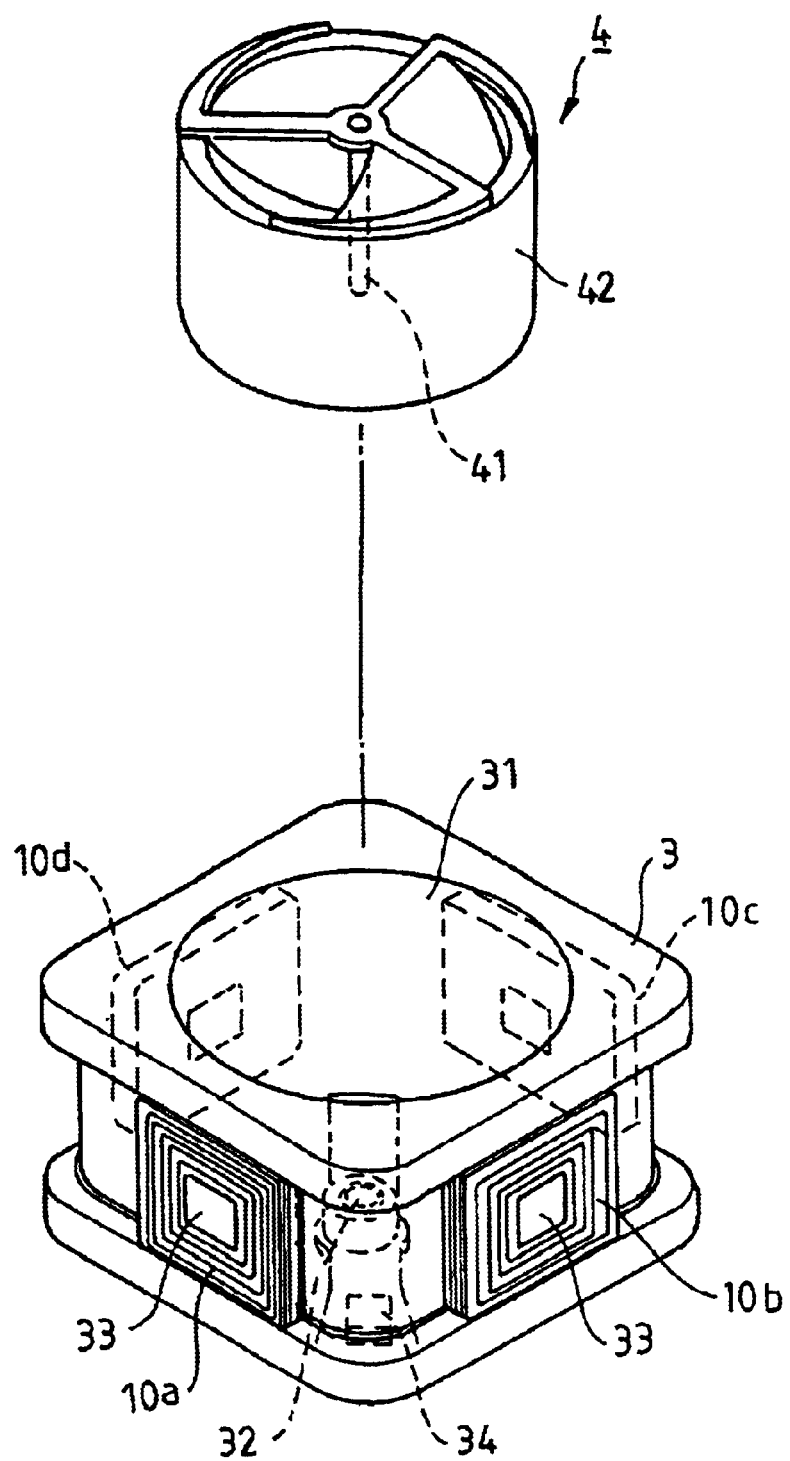
FIG. 4 is an exploded perspective view of a brushless motor having a radial air gap and using the method in accordance with the present invention.
Figure 5:
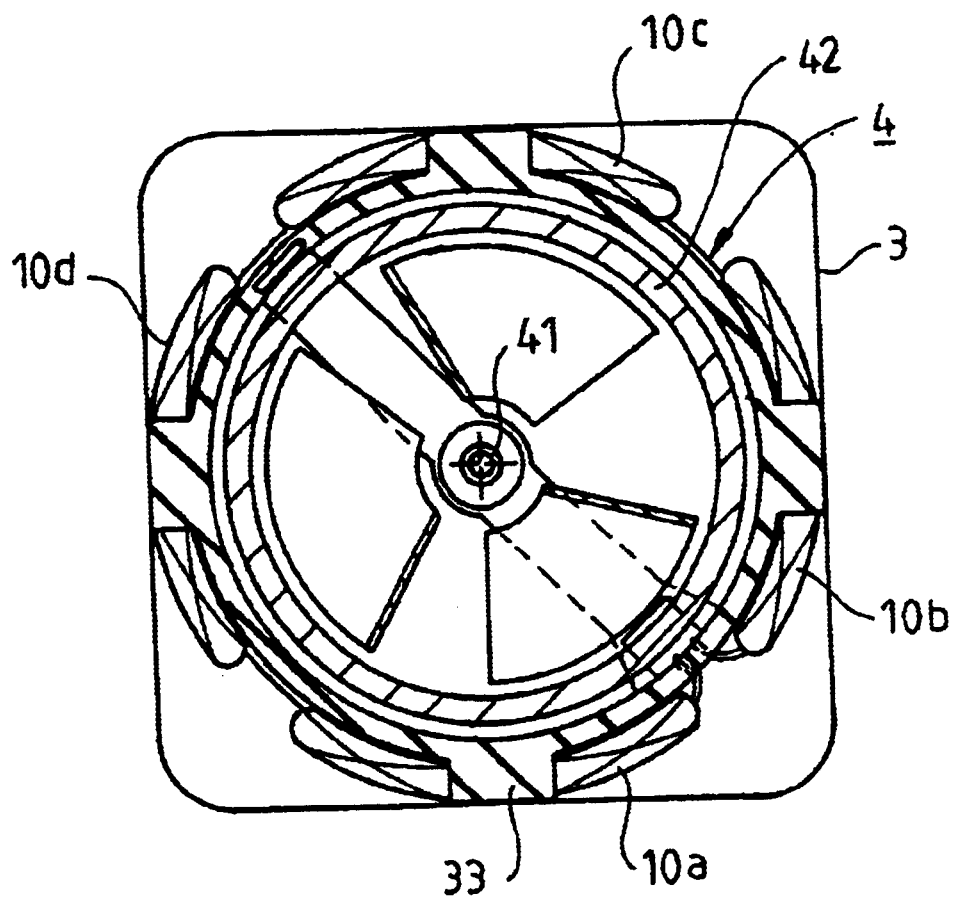
FIG. 5 is a sectional view of the brushless motor in FIG. 4.

FIGS. 4 and 5 illustrate a motor having a radial air gap and using the winding method in accordance with the present invention. The motor comprises a casing 3 having a chamber 31. A support section 32 is provided in a bottom of the chamber 31 for rotatably supporting a shaft 41 of a rotor 4. The rotor 4 comprises a permanent ring magnet 42 having north and south poles. The casing 3 further comprises plural mounting members or extensions 33 on an outer wall face or an inner wall face thereof. Each mounting member 33 may be a countersink or a peg for winding, mounting, and retaining a respective coil 10a, 10b, 10c, 10d of the stator coil assembly 10. In addition, the coils 10a, 10b, 10c, and 10d are located corresponding to the permanent ring magnet 42 of the rotor 4. Since the direction of the electric current and the direction of the magnetic field of each coil 10a, 10b, 10c, 10d are opposite to those of the coil adjacent thereto, alternating magnetic fields are created when the stator coil assembly 10 is supplied with electric current. The resultant magnetic force may repulse the permanent ring magnet 42 of the rotor 4 to turn. In addition, an IC control means 34 comprised of a Hall element and a drive circuit and provided on the casing 3 detects a change in the polarity of the permanent ring magnet 42 of the rotor 4 and sends a signal to alternately change the direction of each coil 10a, 10b, 10c, 10d, thereby keeping the rotor turning.

Figure 6:
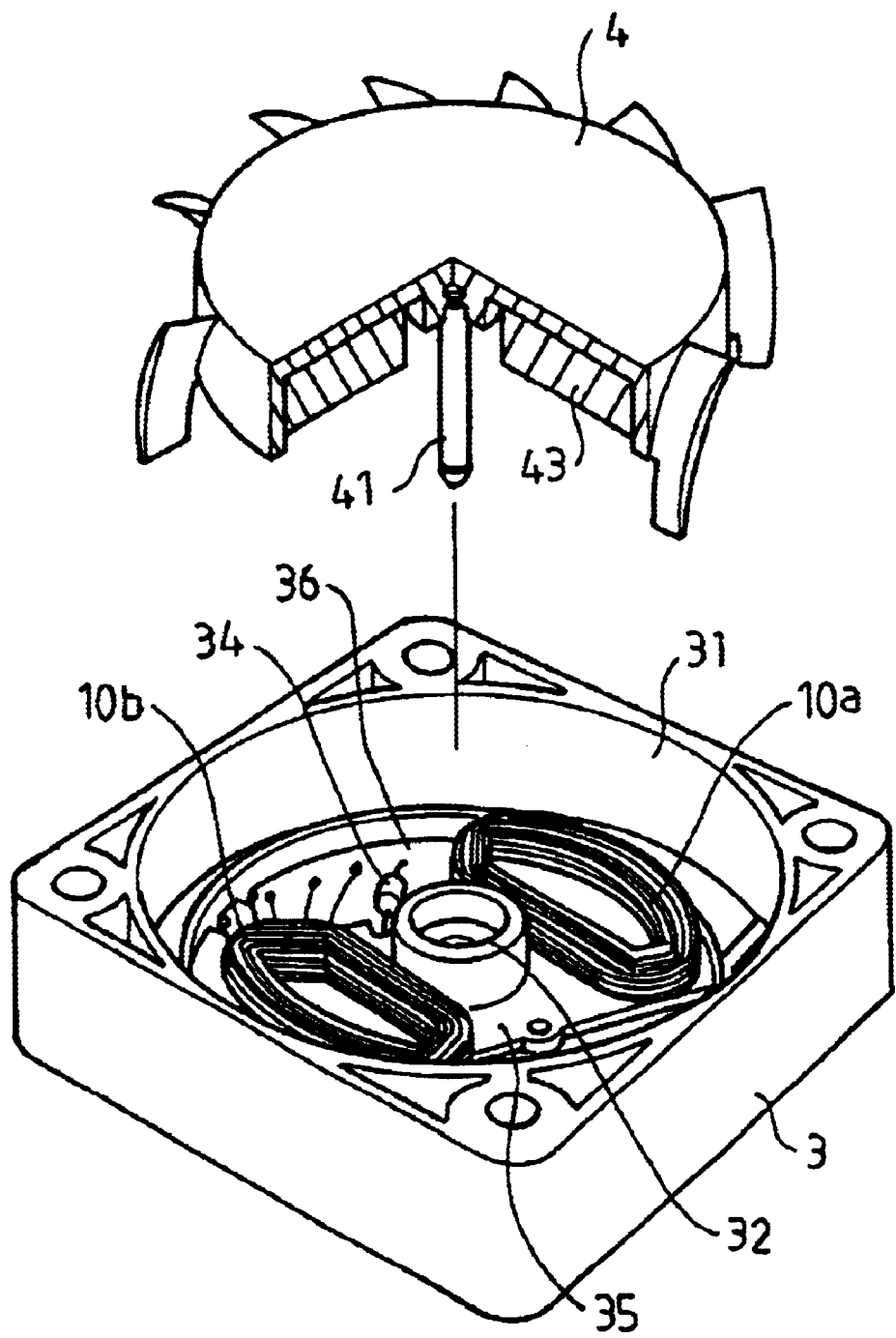
FIG. 6 is an exploded perspective view of a brushless motor having an axial air gap and using the method in accordance with the present invention.
Figure 9:
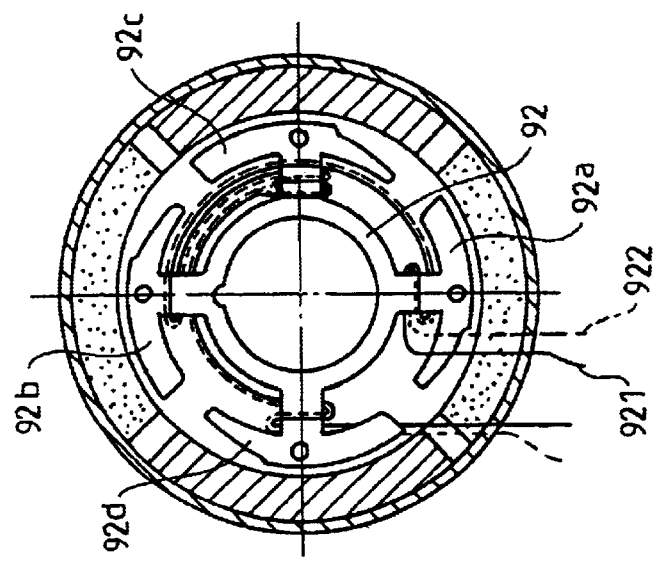
FIG. 9 is a sectional view of a further conventional brushless motor having a radial air gap.
Figure 8:
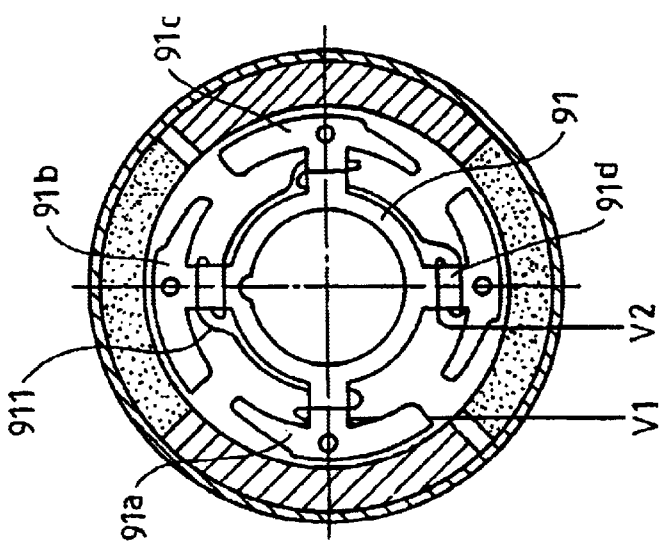
FIG. 8 is a sectional view of another conventional brushless motor having a radial air gap.
Figure 7:
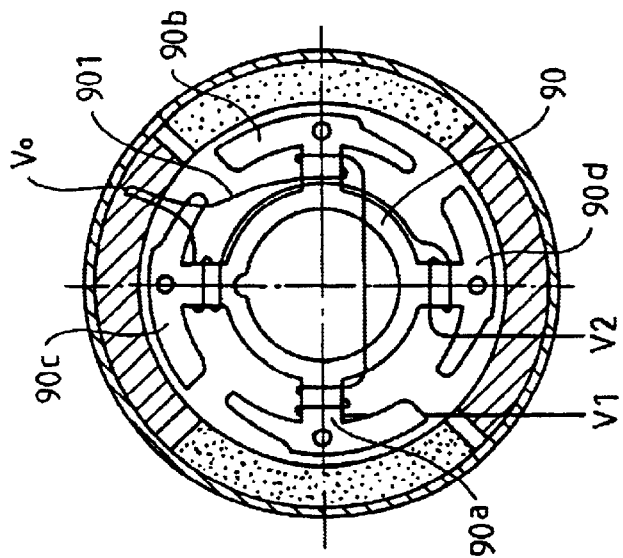
FIG. 7 is a sectional view of a conventional brushless motor having a radial air gap.
Figure 10:
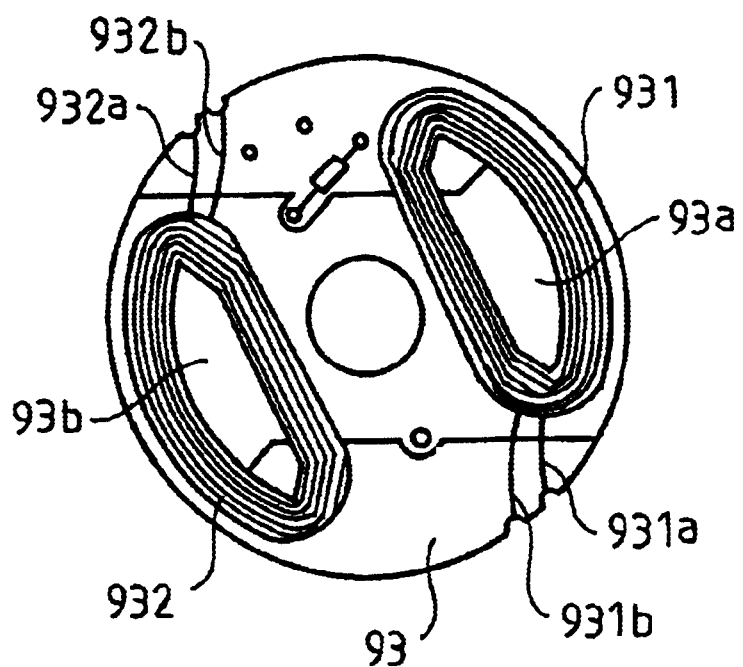
FIG. 10 is a plan view of a coreless stator armature of a conventional brushless motor having an axial air gap.

FIG. 6 illustrates a motor having an axial air gap and using the winding method in accordance with the present invention. The motor comprises a casing 3 having a chamber 31 for rotatably holding a shaft 41 of a rotor 4. The rotor 4 comprises a disc (not labeled) on a top thereof. A permanent magnetic 43 is mounted to the disc and has north and south poles. A stator yoke 35 and a circuit board 36 are mounted in a bottom of the chamber 31. An IC control means 34 comprised of a Hall element and a drive circuit is provided on the circuit board 36. The stator yoke 35 is provided with two coils 10a and 10b wound by a single conducting wire in accordance with the present invention, wherein the coils 10a and 10b are wound in opposite directions and thus have opposite electric current directions and opposite magnetic field directions. The permanent magnet 43 of the rotor 4 is driven to turn by magnetic repulsive forces created by means of energizing the coils 10a and 10b.

According to the above description, it is appreciated that the D.C. motor stator and the winding method in accordance with the present invention allow easy processing and manufacturing. The short circuit problem of the coils resulting from damage of the coils by the pole plates during the winding procedure is avoided. In addition, the stator assembly having even coils is formed by means of continuously winding a single conducting wire in sequence. Thus, the stator coil assembly has only a first end and a second end, thereby allowing easy electric connection or assembly without the risk of incorrect connection.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A D.C. motor comprising:

a casing comprising a chamber and coil mounting extensions disposed around the chamber for enabling coils to be wound on the casing, the chamber having a support section in a bottom thereof, an IC control means being mounted on the casing, a stator coil assembly being wound and mounted on the coil mounting extensions of the casing and comprising even coils formed by means of continuously winding a single conducting wire in a manner that each of the coils has a winding direction opposite to that of one said coil adjacent thereto; and a rotor comprising a shaft rotatably held in the support section of the casing, the rotor comprising a permanent magnet having north and south poles, the rotor being repulsed and thus driven to turn by magnetic fields created by the coils of the stator coil assembly on the casing.

2. A D.C. motor comprising:

a casing comprising a chamber and coil mounting extensions disposed around the chamber, the chamber having a support section in a bottom thereof, an IC control means being mounted on the casing, a stator coil assembly being wound and mounted on the coil mounting extensions of the casing and comprising even coils formed by means of continuously winding a single conducting wire in a manner that each of the coils has a winding direction opposite to that of one said coil adjacent thereto; and a rotor comprising a shaft rotatably held in the support section of the casing, the rotor comprising a permanent magnet having north and south poles, the rotor being repulsed and thus driven to turn by magnetic fields created by the coils of the stator coil assembly on the casing, wherein the mounting extensions project outwardly from a wall defining the chamber for mounting the coils, respectively.

\* \* \* \* \*